United States Patent
Liao (10) Patent No.: US 11,743,113 B2
(45) Date of Patent: Aug. 29, 2023

(54) FAULT RECTIFICATION OPERATION RECOMMENDATION METHOD AND APPARATUS, AND STORAGE MEDIUM

(71) Applicant: HUAWEI TECHNOLOGIES CO., LTD., Guangdong (CN)

(72) Inventor: Wenqi Liao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/825,246

(22) Filed: May 26, 2022

(65) Prior Publication Data

US 2022/0286351 A1 Sep. 8, 2022

Related U.S. Application Data

(63) Continuation of application No. PCT/CN2020/118233, filed on Sep. 28, 2020.

(30) Foreign Application Priority Data

Nov. 27, 2019 (CN) .......................... 201911180239.0

(51) Int. Cl.
*H04L 41/0668* (2022.01)
*H04L 41/0659* (2022.01)
(Continued)

(52) U.S. Cl.
CPC ...... *H04L 41/0668* (2013.01); *G06F 11/0709* (2013.01); *G06F 11/0712* (2013.01);
(Continued)

(58) Field of Classification Search
CPC ............ G06F 11/0709; G06F 11/0712; G06F 11/0793; G06F 11/2252; G06F 11/3442;
(Continued)

(56) References Cited

U.S. PATENT DOCUMENTS 7,162,427 B1 * 1/2007 Myrick ................ G06Q 50/265
705/348
8,005,706 B1 * 8/2011 Cassone ............ G06Q 10/0631
705/7.11
(Continued)

FOREIGN PATENT DOCUMENTS

CN 103746841 A 4/2014
CN 104486411 A 4/2015
(Continued)

OTHER PUBLICATIONS

Huang, "Research on Security Service Chain Mapping Mechanism Oriented to SDN/NFV," Strategic Support Force Information Engineering University, Dec. 2018, 84 pages (with English Abstract).
Extended European Search Report in European Appln No. 20892606.3, dated Dec. 5, 2022, 9 pages.
International Search Report and Written Opinion in International Appln. No. PCT/CN2020/118233, dated Jan. 4, 2021, 16 pages (with English translation).

*Primary Examiner* — Le H Luu
(74) *Attorney, Agent, or Firm* — Fish & Richardson P.C.

(57) ABSTRACT

This application discloses a fault rectification operation recommendation method and apparatus, and a storage medium in the field of communication technologies. In some implementations, after fault information is obtained, a rectification contingency plan corresponding to the fault information may be searched for from a contingency plan library. When the rectification contingency plan corresponding to the fault information cannot be found in the contingency plan library, the fault information may be processed by using a recommendation model to obtain a recommended contingency plan. Further, one operation is selected from one or more candidate operations included in the recommended contingency plan as a fault rectification operation.

12 Claims, 5 Drawing Sheets

(51) Int. Cl.
  *H04L 41/0663*  (2022.01)
  *H04L 41/0654*  (2022.01)
  *G06F 11/07*  (2006.01)
  *H04W 24/04*  (2009.01)
  *G06F 11/22*  (2006.01)
  *H04L 41/40*  (2022.01)
  *H04L 41/147*  (2022.01)

(52) U.S. Cl.
  CPC ...... *G06F 11/0793* (2013.01); *G06F 11/2252* (2013.01); *H04L 41/0654* (2013.01); *H04L 41/0659* (2013.01); *H04L 41/0663* (2013.01); *H04L 41/147* (2013.01); *H04L 41/40* (2022.05); *H04W 24/04* (2013.01)

(58) Field of Classification Search
  CPC .......... G06F 16/9035; G06F 8/654; H04L 41/0654; H04L 41/0659; H04L 41/0663; H04L 41/0668; H04L 41/147; H04L 41/40; H04L 41/069; H04L 41/0806; H04W 24/04; G06N 5/046; G06Q 10/06312; G06Q 10/0631; G06Q 10/103; G06Q 50/265; G08G 1/202
  See application file for complete search history.

(56) References Cited

U.S. PATENT DOCUMENTS

| | | | |
|---|---|---|---|
| 8,527,327 B1* | 9/2013 | Lawrence | G06Q 10/103 705/7.41 |
| 9,079,505 B1* | 7/2015 | Hyde | G08G 1/202 |
| 9,407,359 B2 | 8/2016 | Swinkels et al. | |
| 2006/0161884 A1* | 7/2006 | Lubrecht | G06F 11/3442 717/104 |
| 2015/0215163 A1* | 7/2015 | Kowalski | H04L 41/0806 714/4.1 |
| 2016/0364666 A1* | 12/2016 | Johnson | G06Q 10/06312 |
| 2017/0039105 A1 | 2/2017 | Shivanna et al. | |
| 2017/0235561 A1* | 8/2017 | Butler | G06F 8/654 717/168 |
| 2017/0302504 A1* | 10/2017 | Wang | H04L 41/069 |
| 2020/0015102 A1* | 1/2020 | Sun | H04L 41/40 |
| 2020/0053532 A1* | 2/2020 | Hurst | G06F 11/0793 |
| 2020/0074332 A1* | 3/2020 | Muise | G06N 5/046 |

FOREIGN PATENT DOCUMENTS

| | | |
|---|---|---|
| CN | 106941421 A | 7/2017 |
| CN | 108418711 A | 8/2018 |
| CN | 109840157 A | 6/2019 |
| WO | 2019011018 A1 | 1/2019 |

\* cited by examiner

FIG. 7

FAULT RECTIFICATION OPERATION RECOMMENDATION METHOD AND APPARATUS, AND STORAGE MEDIUM

CROSS-REFERENCE TO RELATED APPLICATIONS

This application is a continuation of International Application No. PCT/CN2020/118233, filed on Sep. 28, 2020, which claims priority to Chinese Patent Application No. 201911180239.0, filed on Nov. 27, 2019. The disclosures of the aforementioned applications are hereby incorporated by reference in their entireties.

TECHNICAL FIELD

This application relates to the field of communication technologies, and in particular, to a fault rectification operation recommendation method and apparatus, and a storage medium.

BACKGROUND

In a software defined network (SDN) architecture, an SDN controller can centrally control a plurality of nodes. When any node in the plurality of nodes is faulty, the SDN controller can recommend a rectification operation used to rectify a fault to the node.

In a related technology, a contingency plan library may be configured in the SDN controller based on manual experience, and the contingency plan library stores a mapping relationship between fault information and a rectification contingency plan. After receiving fault information from a faulty node, the SDN controller may search for a rectification contingency plan corresponding to the fault information from the contingency plan library based on the fault information. If the rectification contingency plan corresponding to the fault information is found, the SDN controller may display a rectification operation included in the found rectification contingency plan, and one rectification operation is manually selected as a fault rectification operation and delivered to the faulty node, so that the faulty node rectifies a fault based on the fault rectification operation. However, if the rectification contingency plan corresponding to the fault information does not exist in the contingency plan library, the SDN controller cannot provide a rectification operation for the faulty node. Consequently, the fault cannot be rectified.

SUMMARY

This application provides a fault rectification operation recommendation method and apparatus, and a storage medium, to resolve a problem in a related technology that a rectification operation cannot be provided for a faulty node when a rectification contingency plan corresponding to fault information does not exist in a contingency plan library. Technical solutions are as follows:

According to a first aspect, a fault rectification operation recommendation method is provided, where the method includes: obtaining fault information of a faulty node; if a rectification contingency plan corresponding to the fault information does not exist in a contingency plan library, determining a recommended contingency plan based on the fault information by using a recommendation model, where the recommended contingency plan includes one or more candidate operations; and determining a fault rectification operation in the one or more candidate operations included in the recommended contingency plan, and recommending the fault rectification operation to the faulty node, so that the faulty node rectifies a fault based on the fault rectification operation.

In this embodiment of this application, when the rectification contingency plan corresponding to the fault information cannot be found in the contingency plan library, the fault information may be processed by using the recommendation model to obtain the recommended contingency plan. Further, one operation is selected from the one or more candidate operations included in the recommended contingency plan as the fault rectification operation. This resolves a problem that a rectification operation cannot be provided for the faulty node when the rectification contingency plan corresponding to the fault information does not exist in the contingency plan library.

Optionally, the fault information includes a plurality of fault parameters, one or more parameters of the recommendation model include a plurality of fault feature factors, and each of the plurality of fault feature factors corresponds to one of the plurality of fault parameters. On this basis, an implementation process of determining the recommended contingency plan based on the fault information by using the recommendation model may be: using the plurality of fault parameters as inputs of the recommendation model, and determining the recommended contingency plan based on the plurality of fault feature factors by using the recommendation model.

Optionally, the one or more parameters of the recommendation model further include a configuration impact factor, and the configuration impact factor includes original configuration information of the faulty node and physical topology information of a network in which the faulty node is located. On this basis, an implementation process of determining the fault rectification operation in the one or more candidate operations included in the recommended contingency plan may be: using a first candidate operation as an input of the recommendation model, and determining a configuration impact degree corresponding to the first candidate operation based on the configuration impact factor by using the recommendation model, where the configuration impact degree is a predicted impact degree of the first candidate operation on a configuration of the faulty node and a physical topology of the network in which the faulty node is located, and the first candidate operation is any one of the one or more candidate operations; and using a candidate operation corresponding to a smallest configuration impact degree in the one or more candidate operations as the fault rectification operation.

That is, in this embodiment of this application, the configuration impact degree of the candidate operation may be determined, and the fault rectification operation may be recommended based on the configuration impact degree, so that the recommended fault rectification operation has the smallest impact on the configuration of the faulty node and the physical topology of the network in which the faulty node is located.

Optionally, after recommending the fault rectification operation to the faulty node, the method further includes: receiving a rectification result fed back by the faulty node after the faulty node rectifies the fault based on the fault rectification operation, where the rectification result includes routing information and physical topology information of the network in which the faulty node is located after the faulty node rectifies the fault; using the routing information and the physical topology information after the fault is rectified as inputs of a data plane verification (DPV) model, and determining a data plane impact degree corresponding to the fault rectification operation by using the DPV model, where the data plane impact degree is an actual impact degree caused by the fault rectification operation on the configuration of the faulty node and the physical topology of the network in which the faulty node is located; generating a fault sample based on the data plane impact degree corresponding to the fault rectification operation, the fault rectification operation, and the fault information; and adjusting the one or more parameters of the recommendation model based on the fault sample.

After the fault rectification operation is recommended, an impact degree of the fault rectification operation on a data plane may be further verified by using the DPV model, and the fault sample is further generated based on the data plane impact degree, the fault rectification operation, and the fault information, to further adjust the one or more parameters of the recommendation model. This improves accuracy of the recommendation model for recommending a contingency plan.

According to a second aspect, a fault rectification operation recommendation method is provided, where the method further includes: obtaining fault information of a faulty node; if a rectification contingency plan corresponding to the fault information exists in a contingency plan library, using the rectification contingency plan corresponding to the fault information as a recommended contingency plan, where the recommended contingency plan includes one or more candidate operations; predicting a comprehensive impact degree of each of the one or more candidate operations, where the comprehensive impact degree is used to indicate a magnitude of comprehensive impact of the corresponding candidate operation on a network in which the faulty node is located; and determining a candidate operation corresponding to a smallest comprehensive impact degree in the one or more candidate operations as a fault rectification operation, and recommending the fault rectification operation to the faulty node, so that the faulty node rectifies a fault based on the fault rectification operation.

If the rectification contingency plan corresponding to the fault information exists in the contingency plan library, a comprehensive impact degree of each candidate operation included in the rectification contingency plan may be determined, and the fault rectification operation is further determined based on the comprehensive impact degree. In this way, comprehensive impact of the fault rectification operation on the network in which the faulty node is located is the smallest.

Optionally, the predicting a comprehensive impact degree of each of the one or more candidate operations included in the recommended contingency plan includes: predicting a service impact degree of each of the one or more candidate operations on a service in the network in which the faulty node is located; predicting a configuration impact degree of each of the one or more candidate operations on the network in which the faulty node is located; and determining the comprehensive impact degree corresponding to each candidate operation based on the service impact degree and the configuration impact degree that correspond to each candidate operation.

Optionally, an implementation process of predicting the configuration impact degree of each of the one or more candidate operations on the network in which the faulty node is located may be: obtaining original configuration information of the faulty node and physical topology information of the network in which the faulty node is located; generating prediction configuration information corresponding to a first candidate operation based on the first candidate operation and the original configuration information of the faulty node, where the first candidate operation is any one of the one or more candidate operations; and using the prediction configuration information corresponding to the first candidate operation, the original configuration information of the faulty node, and the physical topology information as inputs of a configuration plane verification (CPV) model, and determining a configuration impact degree corresponding to the first candidate operation by using the CPV model.

Optionally, an implementation process of determining the comprehensive impact degree corresponding to each candidate operation based on the service impact degree and the configuration impact degree that correspond to each candidate operation may be: obtaining a service impact weight and a configuration impact weight; and determining a comprehensive impact degree corresponding to the first candidate operation based on a service impact degree corresponding to the first candidate operation, the service impact weight, the configuration impact degree corresponding to the first candidate operation, and the configuration impact weight.

According to a third aspect, a fault rectification operation recommendation apparatus is provided, where the fault rectification operation recommendation apparatus has a function of implementing behavior of the fault rectification operation recommendation method according to the first aspect or the second aspect. The fault rectification operation recommendation apparatus includes at least one module. The at least one module is configured to implement the fault rectification operation recommendation method provided in the first aspect or the second aspect.

According to a fourth aspect, a fault rectification operation recommendation apparatus is provided, where a structure of the fault rectification operation recommendation apparatus includes a processor and a memory. The memory is configured to: store a program that supports the fault rectification operation recommendation apparatus in performing the fault rectification operation recommendation method provided in the first aspect or the second aspect, and store data used to implement the fault rectification operation recommendation method provided in the first aspect or the second aspect. The processor is configured to execute the program stored in the memory. The fault rectification operation recommendation apparatus may further include a communication bus, and the communication bus is configured to establish a connection between the processor and the memory.

According to a fifth aspect, a computer-readable storage medium is provided. The computer-readable storage medium stores instructions. When the instructions are run on a computer, the computer is enabled to perform the fault rectification operation recommendation method according to the first aspect or the second aspect.

According to a sixth aspect, a computer program product including instructions is provided. When the computer program product runs on a computer, the computer is enabled to perform the fault rectification operation recommendation method according to the first aspect or the second aspect.

Technical effects achieved by the third aspect, the fourth aspect, the fifth aspect, and the sixth aspect are similar to those achieved by corresponding technical means in the first aspect and the second aspect. Details are not described herein again.

Beneficial effects brought by the technical solutions provided in this application include at least the following:

In the embodiments of this application, when the rectification contingency plan corresponding to the fault information cannot be found in the contingency plan library, the fault information may be processed by using the recommendation model to obtain the recommended contingency plan. Further, one operation is selected from the one or more candidate operations included in the recommended contingency plan as the fault rectification operation. This resolves the problem that the rectification operation cannot be provided for the faulty node when the rectification contingency plan corresponding to the fault information does not exist in the contingency plan library.

DESCRIPTION OF EMBODIMENTS

To make objectives, technical solutions, and advantages of this application clearer, the following further describes implementations of this application in detail with reference to the accompanying drawings.

Before embodiments of this application are described in detail, a system architecture in the embodiments of this application is first described.

Figure 1:
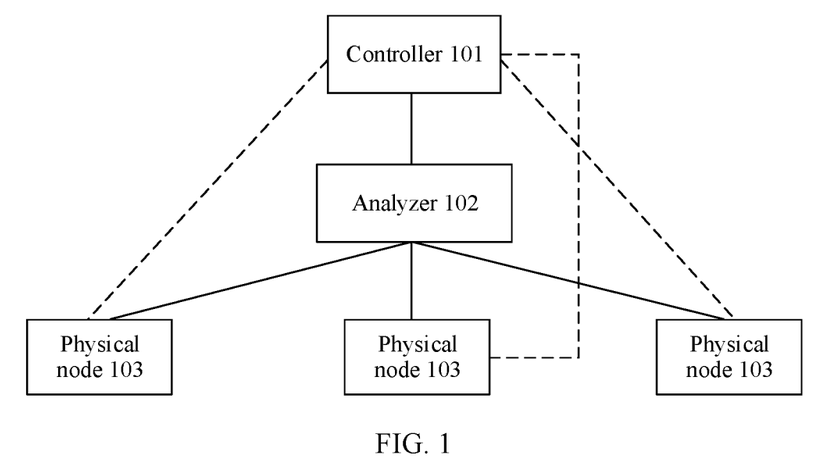
FIG. 1 is a diagram of an architecture of a system related to a fault rectification operation recommendation method according to an embodiment of this application.

FIG. 1 is a diagram of an architecture of a system related to a fault rectification operation recommendation method according to an embodiment of this application. As shown in FIG. 1, the system includes a controller 101, an analyzer 102, and a plurality of physical nodes 103. The controller 101 may communicate with the analyzer 102 and the plurality of physical nodes 103. In addition, the analyzer 102 may also communicate with the plurality of physical nodes 103.

It should be noted that the controller 101 is configured to centrally control allocation of network resources. For example, the controller 101 may control data forwarding on the plurality of physical nodes 103. In addition, in this embodiment of this application, the controller 101 may further receive fault information reported by the analyzer 102, and recommend a fault rectification operation to a faulty device in the plurality of physical nodes 103 by using the fault rectification operation recommendation method according to this embodiment of this application.

The analyzer 102 is configured to: monitor in real time whether each of the plurality of physical nodes 103 is faulty, collect fault information of a faulty node after detecting that a specific physical node 103 is faulty, and report the fault information to the controller 101, so that the controller 101 recommends a rectification operation to the faulty node based on the method provided in this embodiment of this application.

The plurality of physical nodes 103 may be a plurality of devices in a physical network. The plurality of physical nodes 103 are configured to receive and/or send service data.

It should be noted that the controller 101 and the analyzer 102 may be distributed in two different independent devices. Alternatively, the controller 101 and the analyzer 102 may be integrated into one device. This is not limited in this embodiment of this application. Alternatively, the controller 101 may have a function of the analyzer 102. In this case, the foregoing system may not include the analyzer 102. In addition, the plurality of physical nodes 103 may be network devices such as switches or routers. This is not limited in this embodiment of this application.

Figure 2:
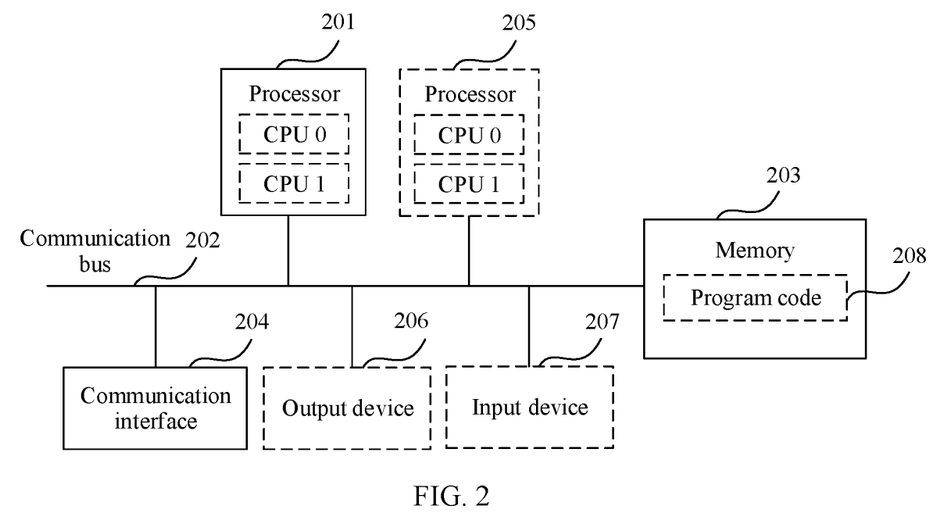
FIG. 2 is a schematic diagram of a structure of a network device according to an embodiment of this application.

FIG. 2 is a schematic diagram of a structure of a network device according to an embodiment of this application. The controller 101 in FIG. 1 may be implemented by using the network device shown in FIG. 2. With reference to FIG. 2, the network device includes at least one processor 201, a communication bus 202, a memory 203, and at least one communication interface 204.

The processor 201 may be a general-purpose central processing unit (CPU), a microprocessor, an application-specific integrated circuit (ASIC), or one or more integrated circuits configured to control program execution in the solutions of this application.

The communication bus 202 may include a path for transmitting information between the foregoing components.

The memory 203 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium capable of carrying or storing expected program code in an instruction form or a data structure form and capable of being accessed by a computer. However, the memory 203 is not limited thereto. The memory 203 may exist independently, and be connected to the processor 201 through the communication bus 202. The memory 203 may alternatively be integrated with the processor 201.

The communication interface 204 may be any apparatus like a transceiver, and is configured to communicate with another device or a communication network, for example, the Ethernet, a radio access network (RAN), or a wireless local area network (WLAN).

During specific implementation, in an embodiment, the processor 201 may include one or more CPUs, for example, a CPU 0 and a CPU 1 shown in FIG. 2.

During specific implementation, in an embodiment, the network device may include a plurality of processors, such as the processor 201 and a processor 205 shown in FIG. 2. Each of the processors may be a single-core (single-CPU) processor, or may be a multi-core (multi-CPU) processor. The processor herein may refer to one or more devices, circuits, and/or processing cores configured to process data (for example, computer program instructions).

During specific implementation, in an embodiment, the network device may further include an output device 206 and an input device 207. The output device 206 communicates with the processor 201, and may display information in a plurality of manners. For example, the output device 206 may be a liquid crystal display (LCD), a light emitting diode (LED) display device, a cathode ray tube (CRT) display device, or a projector. The input device 207 communicates with the processor 201, and may receive an input from a user in a plurality of manners. For example, the input device 207 may be a mouse, a keyboard, a touchscreen device, or a sensing device.

The memory 203 is configured to store program code that is used to perform the solutions of this application, and execution is controlled by the processor 201. The processor 201 is configured to execute program code 208 stored in the memory 203. The program code 208 may include one or more software modules. The controller shown in FIG. 1 may recommend a fault rectification operation for a faulty device by using the processor 201 and one or more software modules in the program code 208 in the memory 203.

The processor in FIG. 2 reads code in the memory, so that the network device shown in FIG. 2 performs some or all operations performed by the controller in the embodiments of this application.

The following describes in detail the fault rectification operation recommendation method provided in the embodiments of this application.

Figure 3:
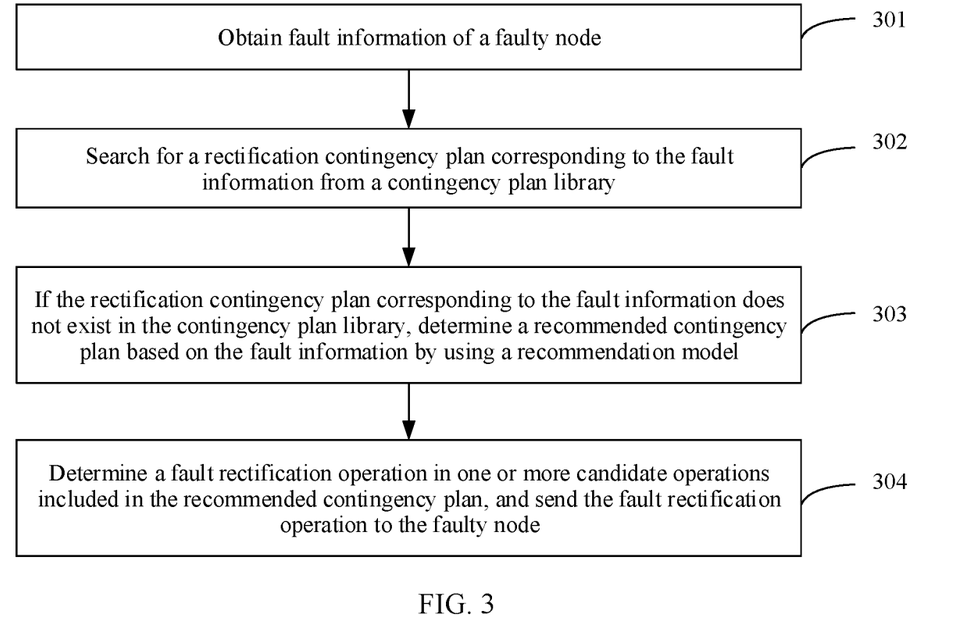
FIG. 3 is a flowchart of a fault rectification operation recommendation method according to an embodiment of this application.

FIG. 3 is a flowchart of a fault rectification operation recommendation method according to an embodiment of this application. The fault rectification operation recommendation method may be applied to the controller 101 shown in FIG. 1. With reference to FIG. 3, the method includes the following steps:

Step 301: Obtain fault information of a faulty node.

In this embodiment of this application, the controller may receive the fault information of the faulty node that is reported by an analyzer. In this case, the analyzer may monitor a plurality of physical nodes in real time. When a specific physical node is detected to be faulty, related information of a fault occurring on the physical node may be collected, and the information is reported to the controller as the fault information.

Optionally, when no analyzer exists, the controller may also monitor a plurality of physical nodes, collect related information of a fault occurring on a specific physical node when the physical node is detected to be faulty, and use the collected information as the fault information. The physical node that is faulty is the faulty node, and the fault occurring on the faulty node may be referred to as a first fault.

In addition, the fault information may include a plurality of fault parameters. The plurality of fault parameters may be two or more of pieces of information such as a fault identifier, a fault location, fault occurrence time, a fault log, and a fault type. For example, the fault identifier included in the fault information is an address resolution protocol (ARP) attack, used to indicate that the occurred fault is an ARP attack. The fault location is node 1 and port 2, used to indicate that the faulty node is node 1, and the fault occurs at port 2 of node 1. The fault occurrence time is 2019-07-14-08:30, and the fault type is 01. It should be noted that different fault identifiers may correspond to a same fault type, or may correspond to different fault types. That is, some faults with different names may be of a same type.

Optionally, in some scenarios, after the physical node is faulty, the physical node may continuously report the fault information to the controller. In this way, in specific duration, fault information received by the controller may include a plurality of pieces of same fault information repeatedly sent by some specific faulty nodes. Alternatively, a same fault may occur on the plurality of physical nodes in a same time period. In this case, the controller receives a plurality of pieces of similar fault information in the time period. Based on this, in this embodiment of this application, the controller may further recommend a rectification operation at a preset time interval. In this case, each time the controller recommends a rectification operation, the controller may obtain a plurality of pieces of fault information received within a preset time interval closest to a current moment, and perform clustering analysis on the plurality of pieces of fault information, to classify the plurality of pieces of fault information into a plurality of classes. Then, the controller may recommend the rectification operation for each class by using the method described below.

Step 302: Search for a rectification contingency plan corresponding to the fault information from a contingency plan library.

After obtaining the fault information, the controller may generate a first fault event based on the fault information, where the first fault event includes an event identifier, an event feature, and an event status. The event identifier is used to uniquely identify the first fault event, the event feature includes the plurality of fault parameters in the fault information, and the event status is a current status of the first fault event. As subsequent processing of the fault event proceeds, the event status is updated in real time. For example, when a recommended contingency plan is obtained in the subsequent step 303, the event status of the first fault event may be updated, to indicate that the recommended contingency plan corresponding to the first fault event has been obtained.

After generating the first fault event, the controller may search for a second fault event similar to the first fault event from the contingency plan library based on the event feature included in the first fault event, and use a rectification contingency plan corresponding to the found second fault event as the rectification contingency plan corresponding to the fault information.

The contingency plan library may store a plurality of fault events and a rectification contingency plan corresponding to each fault event. In addition, each fault event may correspond to one rectification contingency plan or a plurality of rectification contingency plans. Each rectification contingency plan may include one or more rectification operations, and the rectification operation includes instructions used to instruct the faulty node to rectify the fault.

In this embodiment of this application, the event feature includes a plurality of fault parameters. Based on this, the controller may calculate similarities between the first fault event and various fault events in the contingency plan library based on the plurality of fault parameters included in the event feature of the first fault event and a fault parameter included in an event feature of each fault event in the contingency plan library.

For example, the controller may determine a similarity between the first fault event and any fault event in the contingency plan library according to the following algorithm (1):

$$sim(Q, C) = \sum_{f \in F} w_f * \sigma_f(q_f, c_f) \qquad (1)$$

Q is used to represent the first fault event, C is used to represent a specific fault event in the contingency plan library, F is used to represent the event feature of the first fault event, f is used to represent an identifier of a specific fault parameter in the event feature of the first fault event, $w_f$ is used to represent a weight corresponding to the specific fault parameter, $q_f$ is the specific fault parameter in the first fault event, $C_f$ is a fault parameter of a same type as $q_f$ in the specific fault event in the contingency plan library, and $\sigma_f(\ )$ is a similarity calculation function.

By using the foregoing method, the controller may obtain a similarity between the first fault event and each fault event in the contingency plan library through calculation. Then, the controller may search for a similarity greater than a first threshold from a plurality of similarities. If no similarity greater than the first threshold exists in the plurality of similarities obtained through calculation, the controller may determine that no rectification contingency plan corresponding to the fault information exists in the contingency plan library. Next, the controller may perform step 303 and step 304.

It should be noted that a main purpose of the fault event is to manage received fault information. In this embodiment of this application, a step of generating the fault event based on the fault information is an optional step. In this case, the contingency plan library may store a mapping relationship between different fault parameter sets and rectification contingency plans, and the controller may directly perform matching on each fault parameter included in the fault information and fault parameters in the different fault parameter sets stored in the contingency plan library according to the foregoing algorithm (1). Therefore, a similarity between the fault information and each fault parameter set is obtained.

Step 303: If the rectification contingency plan corresponding to the fault information does not exist in the contingency plan library, determine the recommended contingency plan based on the fault information by using a recommendation model.

It can be learned from the foregoing descriptions that if it is found through similarity calculation that no fault event whose similarity to the first fault event is greater than the first threshold exists in the contingency plan library, it indicates that the second fault event similar to the first fault event does not exist in the contingency plan library currently. In addition, the controller may not obtain the rectification contingency plan corresponding to the fault information from the contingency plan library. In this case, the controller may determine the recommended contingency plan based on the fault information by using the recommendation model.

One or more parameters of the recommendation model may include a plurality of fault feature factors, and each fault feature factor may correspond to one of the plurality of fault parameters included in the fault information. For example, if the plurality of fault parameters include the fault location, the fault occurrence time, and a fault source, the plurality of fault feature factors may include a topology feature factor corresponding to the fault location, a time feature factor corresponding to the fault occurrence time, and a source feature factor corresponding to the fault source.

The topology feature factor may be a networking incidence matrix. Each element in the networking incidence matrix is used to represent one node in a current physical network, and a value of an element corresponding to each node is determined based on a distance between each node and the faulty node. A larger quantity of hops between a node and the faulty node corresponds to a longer distance between the node and the faulty node. Correspondingly, a value of an element corresponding to the node is smaller.

A value of the time feature factor is determined based on the fault occurrence time. Because a same fault occurs almost at the same time, the time feature factor of the recommendation model when the fault information is processed may be determined based on the fault occurrence time.

A value of the source feature factor may be determined based on the fault source. The fault source refers to a source address of the fault. For example, when the first fault occurring on the faulty node is an ARP attack, the fault source may be an attack source IP address of the ARP attack.

In addition, the one or more parameters of the recommendation model may further include a text association feature factor, an associated application feature factor, and the like. A value of the text association feature factor may be determined based on the fault type, the fault location, and the like. A value of the associated application feature factor may be determined based on an application associated with the fault location.

In this step, the controller may use the plurality of fault parameters as inputs of the recommendation model, and determine the recommended contingency plan based on the plurality of fault feature factors by using the recommendation model. Each feature factor included in the recommendation model may be used as a weight of a corresponding fault parameter. The recommended contingency plan may include one or more candidate operations.

Step 304: Determine a fault rectification operation in the one or more candidate operations included in the recommended contingency plan, and send the fault rectification operation to the faulty node.

After the fault information is processed to obtain the recommended contingency plan, the recommendation model may be further used to: perform configuration impact analysis on each of the one or more candidate operations included in the recommended contingency plan, and obtain the fault rectification operation from the one or more candidate operations.

The one or more parameters of the recommendation model may further include a configuration impact factor, and the configuration impact factor includes original configuration information of the faulty node and physical topology information of the network in which the faulty node is located. The original configuration information of the faulty node may be an original configuration baseline of the faulty node. The physical topology information of the network in which the faulty node is located may be used to indicate a topology relationship between nodes in the physical network.

On this basis, the recommendation model may be used to process each candidate operation and the configuration impact factor to obtain a configuration impact degree corresponding to the corresponding candidate operation, and a candidate operation corresponding to a smallest configuration impact degree in the one or more candidate operations is used as the fault rectification operation. Any one of the one or more candidate operations is used as an example, and the candidate operation is referred to as a first candidate operation. The first candidate operation may be used as an input of the recommendation model, and a configuration impact degree corresponding to the first candidate operation is determined based on the configuration impact factor by using the recommendation model. For each of other candidate operations, a configuration impact degree corresponding to the corresponding candidate operation may be obtained with reference to processing of the first candidate operation. Then, the recommendation model may output the candidate operation corresponding to the smallest configuration impact degree as the fault rectification operation. The configuration impact degree is a predicted impact degree of the first candidate operation on a configuration of the faulty node and a physical topology of the network in which the faulty node is located. In addition, the configuration impact degree may represent a connectivity degree between the faulty node and another node in the physical network after the first fault occurring on the faulty node is rectified by using the corresponding candidate operation.

Optionally, in some possible implementations, the recommendation model may be further used to perform service impact analysis on each candidate operation, to obtain a service impact degree corresponding to each candidate operation. Then, the recommendation model may be used to determine a comprehensive impact degree of each candidate operation based on the configuration impact degree and the service impact degree that correspond to each candidate operation, and a candidate operation with a smallest comprehensive impact degree is used as the fault rectification operation.

Optionally, in some possible implementations, after the configuration impact degree corresponding to each candidate operation is obtained, the recommendation model may alternatively output all candidate operations and corresponding configuration impact degrees. In this case, the controller may search for candidate operations whose corresponding configuration impact degree are less than a second threshold, and if the candidate operations are found, use one of the found candidate operations as the fault rectification operation. For example, a candidate operation corresponding to a smallest configuration impact degree in the found candidate operations is used as the fault rectification operation. If the candidate operations are not found, the controller may reprocess the fault information by using the recommendation model. In a process of reprocessing, the one or more parameters of the recommendation model may be adjusted.

Optionally, in some possible implementations, if the recommended contingency plan includes only one candidate operation, the recommendation model may not be used to perform configuration impact analysis, but directly output the candidate operation as the fault rectification operation.

After obtaining the fault rectification operation, the controller may send the fault rectification operation to the faulty node, so that the faulty node rectifies the fault based on the fault rectification operation.

Optionally, after the faulty node rectifies the fault based on the fault rectification operation, the faulty node may further feed back a rectification result to the controller. The rectification result includes routing information and physical topology information of the current network after the faulty node is rectified. The routing information after the faulty node is rectified may include a forwarding table or a routing table after the faulty node is rectified.

After receiving the rectification result fed back by the faulty node, the controller may use the routing information and the physical topology information of the network after the fault is rectified and included in the rectification result as inputs of a DPV model. The DPV model is used to determine an actual impact degree of the fault rectification operation on the configuration of the faulty node and the physical topology of the network. Then, the controller may generate a fault sample based on the data plane impact degree, the fault rectification operation, and the fault information, and adjust the one or more parameters of the recommendation model based on the fault sample. That is, the fault sample may be used as sample data to train the recommendation model.

It can be learned that the DPV model can be used to obtain actual impact of the fault rectification operation on the network in which the faulty node is located, but a CPV model can be used to obtain the predicted impact degree of the candidate operation on the network in which the faulty node is located. In this way, the recommendation model is further adjusted based on the data plane impact degree determined by using the DPV model, so that recommendation accuracy of the recommendation model can be improved.

Optionally, in some possible cases, the controller may not only determine the data plane impact degree based on the rectification result, but also analyze an impact degree of the fault rectification operation on service traffic in the physical network based on a real-time service flow in the network in which the faulty node is located. Then, the controller may determine a comprehensive impact degree after rectification based on the service traffic impact degree and the data plane impact degree, and generate a fault sample based on the comprehensive impact degree after rectification to adjust the one or more parameters of the recommendation model.

In this embodiment of this application, when the rectification contingency plan corresponding to the fault information cannot be found in the contingency plan library, the fault information may be processed by using the recommendation model to obtain the recommended contingency plan. Further, one operation is selected from the one or more candidate operations included in the recommended contingency plan as the fault rectification operation. This resolves a problem that a rectification operation cannot be provided for the faulty node when the rectification contingency plan corresponding to the fault information does not exist in the contingency plan library.

In addition, in this embodiment of this application, after the recommended contingency plan is obtained, the configuration impact degree of each candidate operation included in the recommended contingency plan may be predicted in advance, and then the candidate operation with the smallest configuration impact degree is used as the fault rectification operation. In this way, impact on each node in the network when the faulty node rectifies the fault by using the fault rectification operation can be minimized.

The foregoing embodiment mainly describes an implementation process of recommending a fault rectification operation to a faulty node based on fault information of the faulty node when a rectification contingency plan corresponding to the fault information does not exist in a contingency plan library. The following describes, with reference to FIG. 4, an implementation process in which a controller recommends a fault rectification operation to a faulty node based on fault information when a rectification contingency plan corresponding to the fault information exists in a contingency plan library.

Figure 4:
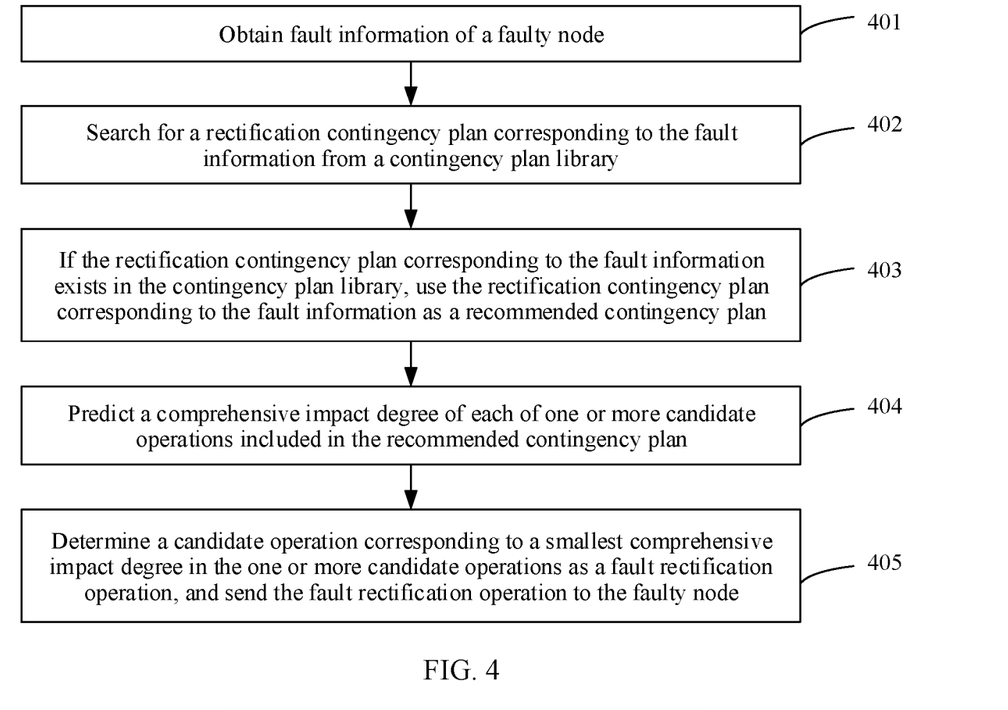
FIG. 4 is a flowchart of another fault rectification operation recommendation method according to an embodiment of this application.

Step 401: Obtain fault information of a faulty node.

For an implementation of this step, refer to step 301 in the foregoing embodiment. Details are not described again in this embodiment of this application.

Step 402: Search for a rectification contingency plan corresponding to the fault information from a contingency plan library.

In this step, a controller may determine a similarity between a first fault event and each fault event in the contingency plan library with reference to the manner described in step 302 in the foregoing embodiment, to obtain a plurality of similarities. If a similarity greater than a first threshold exists in the plurality of similarities, it may be determined that the rectification contingency plan corresponding to the fault information exists in the contingency plan library. Next, the controller may perform step 403 to step 405.

Step 403: If the rectification contingency plan corresponding to the fault information exists in the contingency plan library, use the rectification contingency plan corresponding to the fault information as a recommended contingency plan.

It can be learned from the descriptions in step 402 that if it is found through similarity calculation that a fault event whose similarity to the first fault event is greater than the first threshold exists in the contingency plan library, it indicates that a fault event similar to the first fault event exists in the contingency plan library currently. In this case, the controller may obtain a first similarity from similarities greater than the first threshold, and use a fault event whose similarity to the first fault event is the first similarity as a second fault event. Then, the controller may obtain a rectification contingency plan corresponding to the second fault event, and use the rectification contingency plan as the recommended contingency plan. The first similarity may be a largest similarity among the similarities greater than the first threshold.

Optionally, in another possible implementation, the controller may use all fault events whose similarities to the first fault event are greater than the first threshold as second fault events. That is, there may be a plurality of second fault events. In this case, the controller may obtain a plurality of recommended contingency plans from the contingency plan library based on the second fault events.

Step 404: Predict a comprehensive impact degree of each of one or more candidate operations included in the recommended contingency plan.

After obtaining the recommended contingency plan, for the one or more candidate operations included in the recommended contingency plan, the controller may predict a comprehensive impact degree of each candidate operation on a network in which the faulty node is located.

For example, the controller may predict a service impact degree of each of the one or more candidate operations included in the recommended contingency plan on the network in which the faulty node is located; predict a configuration impact degree of each of the one or more candidate operations on the network in which the faulty node is located; and determine the comprehensive impact degree corresponding to each candidate operation based on the service impact degree and the configuration impact degree that correspond to each candidate operation.

Any one of the one or more candidate operations is used as an example, and the candidate operation is referred to as a first candidate operation. The controller may predict impact on a service currently carried by the faulty node after a fault occurring on the faulty node is rectified by using the first candidate operation. Smaller impact corresponds to a smaller service impact degree. For example, assuming that the first candidate operation is isolating a specific port on the faulty node, the controller may predict whether an existing virtual machine service is affected after the port is isolated. If the virtual machine service is affected, the service impact degree may be determined as a first value; otherwise, the service impact degree may be determined as a second value.

For each of the one or more candidate operations, the controller may predict the service impact degree corresponding to each candidate operation by using the foregoing method.

In this embodiment of this application, the controller may further predict the configuration impact degree of each candidate operation on the network in which the faulty node is located. The configuration impact degree may represent a connectivity degree between the faulty node and another node in the physical network after the first fault occurring on the faulty node is rectified by using the corresponding candidate operation. Any one of the one or more candidate operations is still used as an example. For ease of description, the candidate operation is referred to as a first candidate operation.

For example, the controller may obtain original configuration information of the faulty node and physical topology information of the network in which the faulty node is located; generate prediction configuration information corresponding to the first candidate operation based on the first candidate operation and the original configuration information of the faulty node, where the first candidate operation is any one of the one or more candidate operations; and use the prediction configuration information corresponding to the first candidate operation, the original configuration information of the faulty node, and the physical topology information as inputs of a configuration plane verification CPV model, and determine a configuration impact degree corresponding to the first candidate operation by using the CPV model. The configuration impact degree may be a third value or a fourth value. When the configuration impact degree is the third value, it is used to indicate that the first candidate operation has no impact on a configuration of the faulty node, that is, the first candidate operation has no impact on connectivity between the faulty node and the another node. When the configuration impact degree is the fourth value, it is used to indicate that the first candidate operation has impact on a configuration of the faulty node, that is, the first candidate operation has impact on connectivity between the faulty node and the another node.

The controller may store the physical topology information of the entire physical network and a configuration baseline of each physical node in the physical network. The controller may obtain the physical topology information and obtain a configuration baseline of the faulty node, and use the configuration baseline as the original configuration information of the faulty node.

After obtaining the original configuration information of the faulty node, the controller may generate the prediction configuration information corresponding to the first candidate operation based on the first candidate operation and the original configuration information. It can be learned from the foregoing descriptions that the first candidate operation may include instructions used to instruct to rectify a fault. Based on this, the instructions included in the first candidate operation may be added to the original configuration information, to obtain the prediction configuration information. Alternatively, instructions included in the original configuration information may be modified based on the instructions included in the first candidate operation, to obtain the prediction configuration information.

After obtaining the original configuration information of the faulty node, the physical topology information, and the prediction configuration information corresponding to the first candidate operation, the controller may process the foregoing information by using the CPV model, to obtain the configuration impact degree corresponding to the first candidate operation.

For each of the one or more candidate operations, the controller may predict the configuration impact degree corresponding to each candidate operation by using the foregoing method.

After determining the service impact degree and the configuration impact degree that correspond to each candidate operation, the controller may obtain a service impact weight and a configuration impact weight. Then, a comprehensive impact degree corresponding to the first candidate operation is determined based on a service impact degree corresponding to the first candidate operation, the service impact weight, the configuration impact degree corresponding to the first candidate operation, and the configuration impact weight.

The service impact weight and the configuration impact weight may be preconfigured. Based on this, the controller may determine a product of the service impact weight and the service impact degree of the first candidate operation, determine a product of the configuration impact weight and the configuration impact degree corresponding to the first candidate operation, and use a sum of the two products as the comprehensive impact degree corresponding to the first candidate operation.

For each candidate operation, the controller may determine a comprehensive impact degree corresponding to the corresponding candidate operation with reference to the foregoing method.

It should be noted that, in a possible case, the controller may not perform service impact analysis, that is, may not predict the service impact degree. In this case, the determined configuration impact degree may be directly used as the comprehensive impact degree.

Step 405: Determine a candidate operation corresponding to a smallest comprehensive impact degree in the one or more candidate operations as a fault rectification operation, and send the fault rectification operation to the faulty node, so that the faulty node rectifies the fault based on the fault rectification operation.

After obtaining the comprehensive impact degree corresponding to each candidate operation, the controller may determine the candidate operation corresponding to the smallest comprehensive impact degree as the fault rectification operation, and deliver the fault rectification operation to the faulty node, so that the faulty node may rectify the occurred first fault based on the fault rectification operation.

In this embodiment of this application, when the rectification contingency plan corresponding to the fault information is found in the contingency plan library, the rectification contingency plan corresponding to the fault information may be used as the recommended contingency plan. After the recommended contingency plan is obtained, the comprehensive impact degree of each candidate operation included in the recommended contingency plan may be predicted in advance. The comprehensive impact degree may be obtained through comprehensive calculation based on the predicted service impact degree and the predicted configuration impact degree, and the candidate operation with the smallest comprehensive impact degree is used as the fault rectification operation. In this way, when the faulty node rectifies the fault by using the fault rectification operation, impact on a service carried by the faulty node and a connected node can be minimized.

Figure 5:
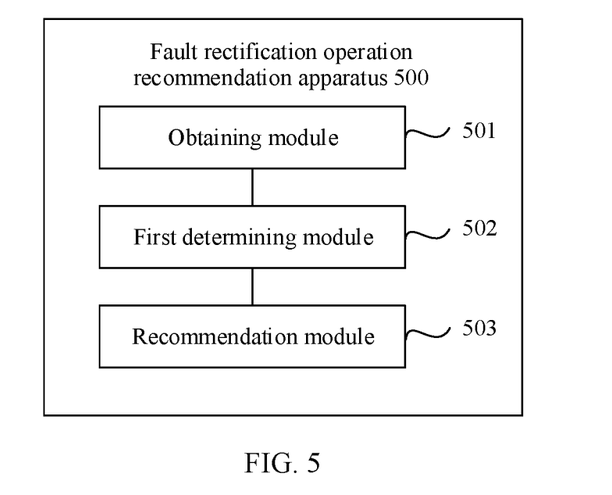
FIG. 5 is a schematic diagram of a structure of a fault rectification operation recommendation apparatus according to an embodiment of this application.

With reference to FIG. 5, an embodiment of this application provides a fault rectification operation recommendation apparatus 500. The apparatus 500 includes:

an obtaining module 501, configured to perform step 301 in the foregoing embodiment;

a first determining module 502, configured to perform step 303 in the foregoing embodiment; and a recommendation module 503, configured to perform step 304 in the foregoing embodiment.

Optionally, fault information includes a plurality of fault parameters, a parameter of a recommendation model includes a plurality of fault feature factors, and each of the plurality of fault feature factors corresponds to one of the plurality of fault parameters.

The first determining module 502 is specifically configured to:

use the plurality of fault parameters as inputs of the recommendation model, and determine a recommended contingency plan based on the plurality of fault feature factors by using the recommendation model.

Optionally, the one or more parameters of the recommendation model further include a configuration impact factor, and the configuration impact factor includes original configuration information of a faulty node and physical topology information of a network in which the faulty node is located.

The recommendation module 503 is specifically configured to:

use a first candidate operation as an input of the recommendation model, and determine a configuration impact degree corresponding to the first candidate operation based on the configuration impact factor by using the recommendation model, where the configuration impact degree is a predicted impact degree of the first candidate operation on a configuration of the faulty node and a physical topology of the network in which the faulty node is located, and the first candidate operation is any one of one or more candidate operations; and use a candidate operation corresponding to a smallest configuration impact degree in the one or more candidate operations as a fault rectification operation.

Figure 6:
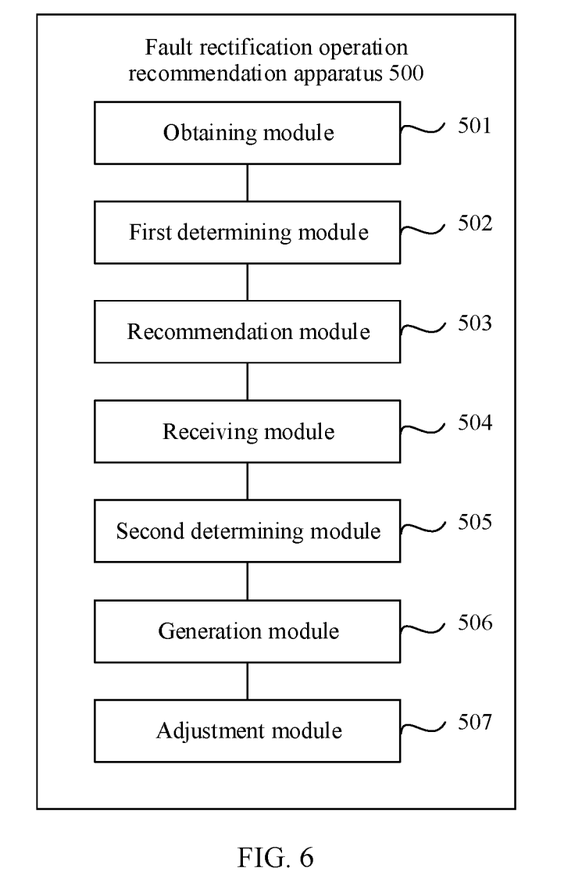
FIG. 6 is a schematic diagram of a structure of another fault rectification operation recommendation apparatus according to an embodiment of this application.

Optionally, with reference to FIG. 6, the apparatus 500 further includes:

a receiving module 504, configured to receive a rectification result fed back by the faulty node after the faulty node rectifies a fault based on the fault rectification operation, where the rectification result includes routing information and physical topology information of the network in which the faulty node is located after the faulty node rectifies the fault;

a second determining module 505, configured to: use the routing information and the physical topology information after the fault is rectified as inputs of a data plane verification DPV model, and determine a data plane impact degree corresponding to the fault rectification operation by using the DPV model, where the data plane impact degree is an actual impact degree caused by the fault rectification operation on the configuration of the faulty node and the physical topology of the network in which the faulty node is located;

a generation module 506, configured to generate a fault sample based on the data plane impact degree corresponding to the fault rectification operation, the fault rectification operation, and the fault information; and an adjustment module 507, configured to adjust the one or more parameters of the recommendation model based on the fault sample.

In conclusion, in this embodiment of this application, when a rectification contingency plan corresponding to the fault information cannot be found in a contingency plan library, the fault information may be processed by using the recommendation model to obtain the recommended contingency plan. Further, one operation is selected from the one or more candidate operations included in the recommended contingency plan as the fault rectification operation. This resolves a problem that a rectification operation cannot be provided for the faulty node when the rectification contingency plan corresponding to the fault information does not exist in the contingency plan library.

Figure 7:
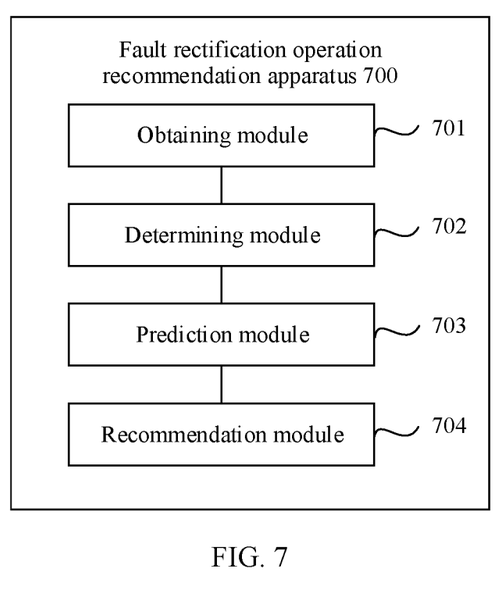
FIG. 7 is a schematic diagram of a structure of still another fault rectification operation recommendation apparatus according to an embodiment of this application.

With reference to FIG. 7, an embodiment of this application provides a fault rectification operation recommendation apparatus 700. The apparatus 700 includes:

an obtaining module 701, configured to perform step 401 in the foregoing embodiment;

a determining module 702, configured to perform step 403 in the foregoing embodiment;

a prediction module 703, configured to perform step 404 in the foregoing embodiment; and a recommendation module 704, configured to perform step 405 in the foregoing embodiment.

Optionally, the prediction module 703 is specifically configured to:

predict a service impact degree of each of one or more candidate operations on a service in a network in which a faulty node is located;

predict a configuration impact degree of each of the one or more candidate operations on the network in which the faulty node is located; and determine a comprehensive impact degree corresponding to each candidate operation based on the service impact degree and the configuration impact degree that correspond to each candidate operation.

Optionally, the prediction module 703 is specifically configured to:

obtain original configuration information of the faulty node and physical topology information of the network in which the faulty node is located;

generate prediction configuration information corresponding to a first candidate operation based on the first candidate operation and the original configuration information of the faulty node, where the first candidate operation is any one of the one or more candidate operations; and use the prediction configuration information corresponding to the first candidate operation, the original configuration information of the faulty node, and the physical topology information as inputs of a configuration plane verification CPV model, and determine a configuration impact degree corresponding to the first candidate operation by using the CPV model.

Optionally, the recommendation module 704 is specifically configured to:

obtain a service impact weight and a configuration impact weight; and determine a comprehensive impact degree corresponding to the first candidate operation based on a service impact degree corresponding to the first candidate operation, the service impact weight, the configuration impact degree corresponding to the first candidate operation, and the configuration impact weight.

In conclusion, in this embodiment of this application, when a rectification contingency plan corresponding to fault information is found in a contingency plan library, the rectification contingency plan corresponding to the fault information may be used as a recommended contingency plan. After the recommended contingency plan is obtained, the comprehensive impact degree of each candidate operation included in the recommended contingency plan may be predicted in advance. The comprehensive impact degree may be obtained through comprehensive calculation based on the predicted service impact degree and the predicted configuration impact degree, and a candidate operation with a smallest comprehensive impact degree is used as a fault rectification operation. In this way, when the faulty node rectifies a fault by using the fault rectification operation, impact on a service carried by the faulty node and a connected node can be minimized.

It should be noted that, when the fault rectification operation recommendation apparatus provided in the foregoing embodiment recommends a fault rectification operation, division into the foregoing functional modules is merely used as an example for illustration. During actual application, the functions may be allocated to different functional modules for implementation as required. To be specific, an internal structure of a device is divided into different functional modules to implement all or a part of the functions described above. In addition, the fault rectification operation recommendation apparatus provided in the foregoing embodiment and the embodiment of the fault rectification operation recommendation method belong to a same concept. For a specific implementation process, refer to the method embodiment. Details are not described herein again.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedure or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital versatile disc (DVD)), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A fault rectification operation recommendation method, wherein the method comprises:

obtaining fault information of a faulty node;

in response to determining that a rectification contingency plan corresponding to the fault information does not exist in a contingency plan library, determining a recommended contingency plan based on the fault information by using a recommendation model, wherein the recommended contingency plan comprises one or more candidate operations;

determining a fault rectification operation in the one or more candidate operations comprised in the recommended contingency plan; and sending the fault rectification operation to the faulty node recommending the faulty node to rectify a fault based on the fault rectification operation.

2. The method according to claim 1, wherein the fault information comprises a plurality of fault parameters, one or more parameters of the recommendation model comprise a plurality of fault feature factors, and each of the plurality of fault feature factors corresponds to one of the plurality of fault parameters; and wherein the determining a recommended contingency plan based on the fault information by using a recommendation model comprises:

determining the plurality of fault parameters as inputs of the recommendation model; and determining the recommended contingency plan based on the plurality of fault feature factors by using the recommendation model.

3. The method according to claim 2, wherein the one or more parameters of the recommendation model further comprise a configuration impact factor, and the configuration impact factor comprises original configuration information of the faulty node and physical topology information of a network in which the faulty node is located; and wherein the determining a fault rectification operation in the one or more candidate operations comprised in the recommended contingency plan comprises:

determining a first candidate operation as an input of the recommendation model;

determining a configuration impact degree corresponding to the first candidate operation based on the configuration impact factor by using the recommendation model, wherein the configuration impact degree is a predicted impact degree of the first candidate operation on a configuration of the faulty node and a physical topology of a network in which the faulty node is located, and the first candidate operation is any one of the one or more candidate operations; and determining a candidate operation corresponding to a smallest configuration impact degree in the one or more candidate operations as the fault rectification operation.

4. The method according to claim 1, wherein after recommending the fault rectification operation to the faulty node, the method further comprises:

receiving a rectification result fed back by the faulty node, wherein the rectification result comprises routing information and physical topology information of a network in which the faulty node is located after the faulty node rectifies the fault;

determining the routing information and the physical topology information after the fault is rectified as inputs of a data plane verification (DPV) model;

determining a data plane impact degree corresponding to the fault rectification operation by using the DPV model, wherein the data plane impact degree is an actual impact degree caused by the fault rectification operation on a configuration of the faulty node and the physical topology of the network in which the faulty node is located;

generating a fault sample based on the data plane impact degree corresponding to the fault rectification operation, the fault rectification operation, and the fault information; and adjusting one or more parameters of the recommendation model based on the fault sample.

5. An apparatus, wherein the apparatus comprises:

at least one processor; and one or more memories coupled to the at least one processor and storing instructions which when executed by the at least one processor, cause the apparatus to:

obtain fault information of a faulty node;

in response to determining that a rectification contingency plan corresponding to the fault information does not exist in a contingency plan library, determine a recommended contingency plan based on the fault information by using a recommendation model, wherein the recommended contingency plan comprises one or more candidate operations;

determine a fault rectification operation in the one or more candidate operations comprised in the recommended contingency plan; and send the fault rectification operation to the faulty node recommending the faulty node to rectify a fault based on the fault rectification operation.

6. The apparatus according to claim 5, wherein the fault information comprises a plurality of fault parameters, one or more parameters of the recommendation model comprise a plurality of fault feature factors, and each of the plurality of fault feature factors corresponds to one of the plurality of fault parameters; and wherein the instructions executed by the at least one processor to further cause the apparatus to:

determine the plurality of fault parameters as inputs of the recommendation model; and determine the recommended contingency plan based on the plurality of fault feature factors by using the recommendation model.

7. The apparatus according to claim 6, wherein the one or more parameters of the recommendation model further comprise a configuration impact factor, and the configuration impact factor comprises original configuration information of the faulty node and physical topology information of a network in which the faulty node is located; and wherein the instructions executed by the at least one processor to further cause the apparatus to:

determine a first candidate operation as an input of the recommendation model;

determine a configuration impact degree corresponding to the first candidate operation based on the configuration impact factor by using the recommendation model, wherein the configuration impact degree is a predicted impact degree of the first candidate operation on a configuration of the faulty node and a physical topology of the network in which the faulty node is located, and the first candidate operation is any one of the one or more candidate operations; and determine a candidate operation corresponding to a smallest configuration impact degree in the one or more candidate operations as the fault rectification operation.

8. The apparatus according to claim 5, wherein the instructions executed by the at least one processor to further cause the apparatus to:

receive a rectification result fed back by the faulty node, wherein the rectification result comprises routing information and physical topology information of a network in which the faulty node is located after the faulty node rectifies the fault;

determine the routing information and the physical topology information after the fault is rectified as inputs of a data plane verification (DPV) model;

determine a data plane impact degree corresponding to the fault rectification operation by using the DPV model, wherein the data plane impact degree is an actual impact degree caused by the fault rectification operation on a configuration of the faulty node and the physical topology of the network in which the faulty node is located;

generate a fault sample based on the data plane impact degree corresponding to the fault rectification operation, the fault rectification operation, and the fault information; and adjust one or more parameters of the recommendation model based on the fault sample.

9. A non-transitory storage medium, storing a program that is executable by one or more processors, the program including instructions comprising:

obtaining fault information of a faulty node;

in response to determining that a rectification contingency plan corresponding to the fault information does not exist in a contingency plan library, determining a recommended contingency plan based on the fault information by using a recommendation model, wherein the recommended contingency plan comprises one or more candidate operations;

determining a fault rectification operation in the one or more candidate operations comprised in the recommended contingency plan; and sending the fault rectification operation to the faulty node recommending the faulty node to rectify a fault based on the fault rectification operation.

10. The non-transitory storage medium according to claim 9, wherein the fault information comprises a plurality of fault parameters, one or more parameters of the recommendation model comprise a plurality of fault feature factors, and each of the plurality of fault feature factors corresponds to one of the plurality of fault parameters; and wherein the instructions further comprise:

determining the plurality of fault parameters as inputs of the recommendation model, and determining the recommended contingency plan based on the plurality of fault feature factors by using the recommendation model.

11. The non-transitory storage medium according to claim 10, wherein the one or more parameters of the recommendation model further comprise a configuration impact factor, and the configuration impact factor comprises original configuration information of the faulty node and physical topology information of a network in which the faulty node is located; and wherein the instructions further comprise:

determining a first candidate operation as an input of the recommendation model;

determining a configuration impact degree corresponding to the first candidate operation based on the configuration impact factor by using the recommendation model, wherein the configuration impact degree is a predicted impact degree of the first candidate operation on a configuration of the faulty node and a physical topology of the network in which the faulty node is located, and the first candidate operation is any one of the one or more candidate operations; and determining a candidate operation corresponding to a smallest configuration impact degree in the one or more candidate operations as the fault rectification operation.

12. The non-transitory storage medium according to claim 9, wherein the instructions further comprise:

receiving a rectification result fed back by the faulty node, wherein the rectification result comprises routing information and physical topology information of a network in which the faulty node is located after the faulty node rectifies the fault;

determining the routing information and the physical topology information after the fault is rectified as inputs of a data plane verification (DPV) model;

determining a data plane impact degree corresponding to the fault rectification operation by using the DPV model, wherein the data plane impact degree is an actual impact degree caused by the fault rectification operation on a configuration of the faulty node and the physical topology of the network in which the faulty node is located;

generating a fault sample based on the data plane impact degree corresponding to the fault rectification operation, the fault rectification operation, and the fault information; and adjusting one or more parameters of the recommendation model based on the fault sample.

* * * * *